(12) United States Patent
Kobayashi et al.

(10) Patent No.: US 12,080,152 B2
(45) Date of Patent: Sep. 3, 2024

(54) PROJECTION PROCESSING DEVICE, PROJECTION SYSTEM, METHOD, AND RECORDING MEDIUM WITH PROGRAM RECORDED THEREIN

(71) Applicant: CASIO COMPUTER CO., LTD., Tokyo (JP)

(72) Inventors: Masaki Kobayashi, Tokyo (JP); Kiyoshi Oda, Tokyo (JP); Hiroshi Saito, Tokyo (JP); Akira Inoue, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 22 days.

(21) Appl. No.: 17/947,277

(22) Filed: Sep. 19, 2022

(65) Prior Publication Data

US 2023/0090290 A1   Mar. 23, 2023

(30) Foreign Application Priority Data

Sep. 21, 2021 (JP) .................................. 2021-153329
Dec. 21, 2021 (JP) .................................. 2021-207207

(51) Int. Cl.
*G03B 21/20* (2006.01)
*G03B 21/14* (2006.01)
*G08B 5/36* (2006.01)

(52) U.S. Cl.
CPC ............. *G08B 5/36* (2013.01); *G03B 21/145* (2013.01); *G03B 21/2046* (2013.01); *G03B 21/2053* (2013.01)

(58) Field of Classification Search
CPC .. G03B 21/142; G03B 21/145; G03B 21/147; G03B 21/2046; H04N 9/3141; H04N 9/3185; H04N 9/3194
See application file for complete search history.

(56) References Cited

U.S. PATENT DOCUMENTS

| | | | |
|---|---|---|---|
| 2017/0064273 A1* | 3/2017 | Nebashi | H04N 9/3147 |
| 2019/0033985 A1* | 1/2019 | Ano | G06F 3/03542 |
| 2019/0302964 A1* | 10/2019 | Kyosuna | H04N 9/3155 |
| 2020/0228767 A1* | 7/2020 | Ichieda | H04N 9/3194 |
| 2021/0223670 A1* | 7/2021 | Yeung | H04N 9/3102 |

FOREIGN PATENT DOCUMENTS

| | | |
|---|---|---|
| JP | 2003345999 A | 12/2003 |
| JP | 2013149205 A | 8/2013 |
| JP | 2016122182 A | 7/2016 |
| WO | 2016103560 A1 | 6/2016 |

OTHER PUBLICATIONS

Notice of Reasons for Refusal dated Jan. 9, 2024 received in Japanese Patent Application No. JP 2021-207207.

* cited by examiner

*Primary Examiner* — Sultan Chowdhury
(74) *Attorney, Agent, or Firm* — Scully, Scott, Murphy & Presser, P.C.

(57) ABSTRACT

A projection processing device comprises a processor control unit that acquires, in response to acceptance of input information, projection position information associated with the input information, and instructs a projector to emit light or project an image enabling a user to identify a position based on the acquired projection position information.

13 Claims, 13 Drawing Sheets

FIG. 7

| SEAT INFORMATION | OPERATION INFORMATION |
|---|---|
| TIER A ROW 1 | ROTATION ANGLE 350.9 DEGREES, INCLINATION ANGLE 71.2 DEGREES |
| TIER A ROW 2 | ROTATION ANGLE 350.1 DEGREES, INCLINATION ANGLE 71.1 DEGREES |
| TIER A ROW 3 | ROTATION ANGLE 349.4 DEGREES, INCLINATION ANGLE 70.9 DEGREES |
| TIER A ROW 4 | ROTATION ANGLE 348.6 DEGREES, INCLINATION ANGLE 70.8 DEGREES |
| TIER A ROW 5 | ROTATION ANGLE 347.9 DEGREES, INCLINATION ANGLE 70.6 DEGREES |
| ... | ... |
| TIER C ROW 10 | ROTATION ANGLE 341.5 DEGREES, INCLINATION ANGLE 64.7 DEGREES |
| TIER C ROW 11 | ROTATION ANGLE 340.7 DEGREES, INCLINATION ANGLE 64.6 DEGREES |
| TIER C ROW 12 | ROTATION ANGLE 339.9 DEGREES, INCLINATION ANGLE 64.4 DEGREES |
| TIER C ROW 13 | ROTATION ANGLE 339.1 DEGREES, INCLINATION ANGLE 64.3 DEGREES |
| TIER C ROW 14 | ROTATION ANGLE 338.3 DEGREES, INCLINATION ANGLE 64.2 DEGREES |
| ... | ... |

PROJECTION PROCESSING DEVICE, PROJECTION SYSTEM, METHOD, AND RECORDING MEDIUM WITH PROGRAM RECORDED THEREIN

This application is based on and claims the benefit of priority from Japanese Patent Application Nos. 2021-153329 and 2021-207207, respectively filed on 21 Sep. 2021 and 21 Dec. 2021, the content of which is incorporated herein by reference.

BACKGROUND OF THE INVENTION

Field of the Invention

In the related art, when seating is assigned in facilities, such as theaters, movie theaters, and stadiums, having many seats, a user needs to know the tier and row of a user's own seat from a seat number specified in a ticket or the like and move while confirming the tiers and rows of the actual seats to arrive at the user's own seat position. In order to solve such a problem, there is proposed, for example, a technique as disclosed in Japanese Unexamined Patent Application, Publication No. 2003-345999.

However, in the technique disclosed in Japanese Unexamined Patent Application, Publication No. 2003-345999, since a mobile terminal is used to perform the guidance to the seat position, a user needs to move while comparing the information displayed on the mobile terminal and the actual seats, which makes it difficult for the user to know the user's own seat position at a glance.

The present disclosure relates to a projection processing device, a projection system, a method, and a program.

SUMMARY OF THE INVENTION

An aspect of the present disclosure provides a projection processing device comprising a processor that acquires, in response to acceptance of input information, projection position information associated with the input information, and instructs a projector to emit light or project an image enabling a user to identify a position based on the acquired projection position information.

BRIEF DESCRIPTION OF THE DRAWING

FIG. 7 is a diagram illustrating an operation information table according to an embodiment.

DETAILED DESCRIPTION OF THE PREFERRED EMBODIMENTS

Figure 1:
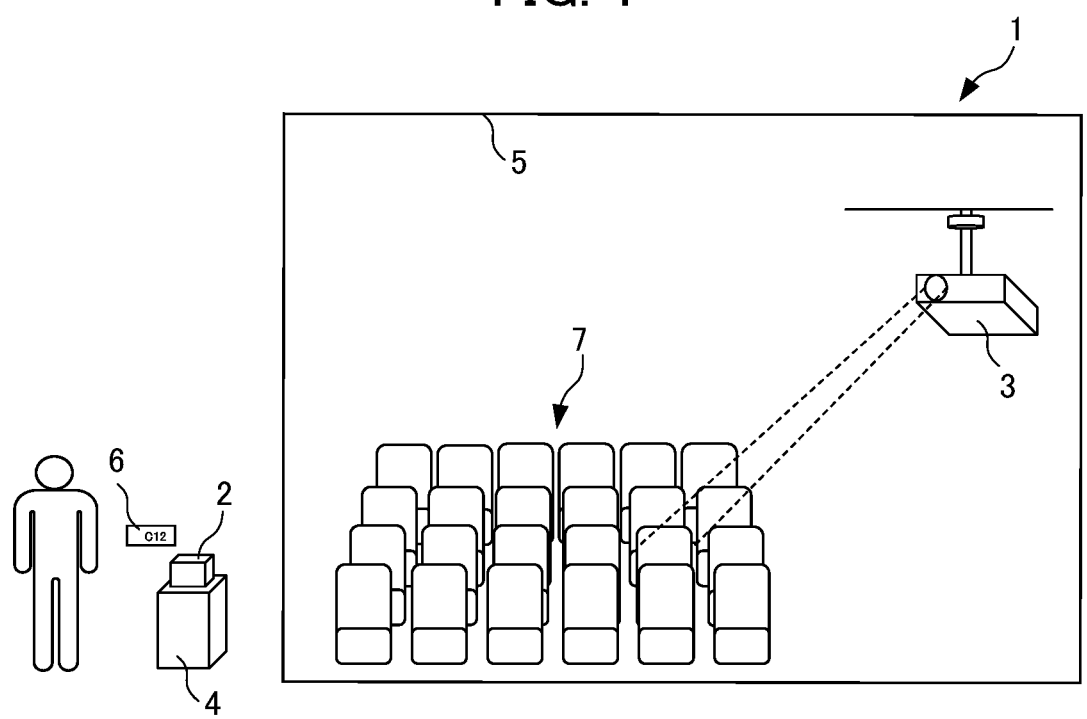
FIG. 1 is a schematic diagram illustrating a projection system according to an embodiment.

<Projection System>
FIG. 1 is a schematic diagram illustrating a projection system 1 according to an embodiment of the present disclosure. The projection system 1 according to the present embodiment has an objective to project video information enabling a user to identify a position of a seat in a specific space 5 such as a theater, a movie theater, a stadium, a railway, a bus, an aircraft, and a ship.

The projection system 1 includes an input terminal 2, a projector 3, and a projection processing device 4. The input terminal 2 is a terminal device for accepting and reading input information indicated in, for example, a ticket 6 owned by a user. The input terminal 2 is configured to be capable of wiredly or wirelessly communicating with the projection processing device 4.

The projector 3 is a device that projects an image (e.g., at least one of a still image and a moving image) in a specific space 5. The projector 3 is configured to be capable of wiredly or wirelessly communicating with the projection processing device 4.

The projection processing device 4 is a device that is configured to be capable of wiredly or wirelessly communicating with the input terminal 2 and the projector 3 to control the input terminal 2 and the projector 3. The projection processing device 4 is a general-purpose computer that can execute various functions when various programs are installed. However, the projection processing device 4 is not limited thereto, and may be a computer incorporated in dedicated hardware.

A plurality of seats 7 are arranged in the specific space 5, and a position of any one of the plurality of seats 7 is designated in the ticket 6. Note that the ticket 6 may be any that is capable of inputting, to the input terminal 2, input information which will be described later, and therefore, for example, a mobile terminal, a recording medium having an RFID chip built therein, or the like may be used instead of the ticket 6.

Figure 2:
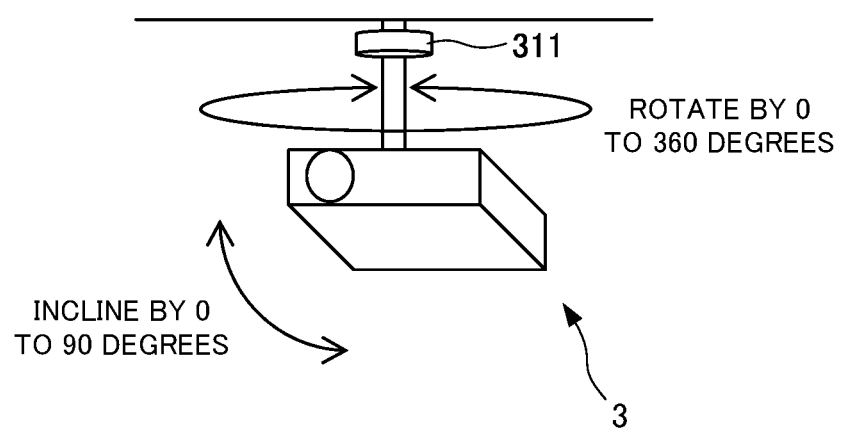
FIG. 2 is a diagram illustrating an overview of a projector according to an embodiment.

<Overview of Projector>
FIG. 2 is a diagram illustrating an overview of the projector 3 according to the present embodiment. As illustrated in FIG. 2, the projector 3 is provided on a ceiling or the like of the specific space 5, and projects a still image and a moving image in the specific space 5. The projector 3 includes a movable mechanism 311 having a rotation mechanism, an inclination mechanism, and the like. The movable mechanism 311 has the rotation mechanism that causes the projector 3 to be rotated in the horizontal direction (e.g., 0 degrees to 360 degrees) perpendicular to the vertical direction, and the inclination mechanism that causes the projector 3 to be inclined in a perpendicular direction (e.g., 0 degrees to 90 degrees) parallel to the vertical direction.

<Input Terminal>

Figure 3:
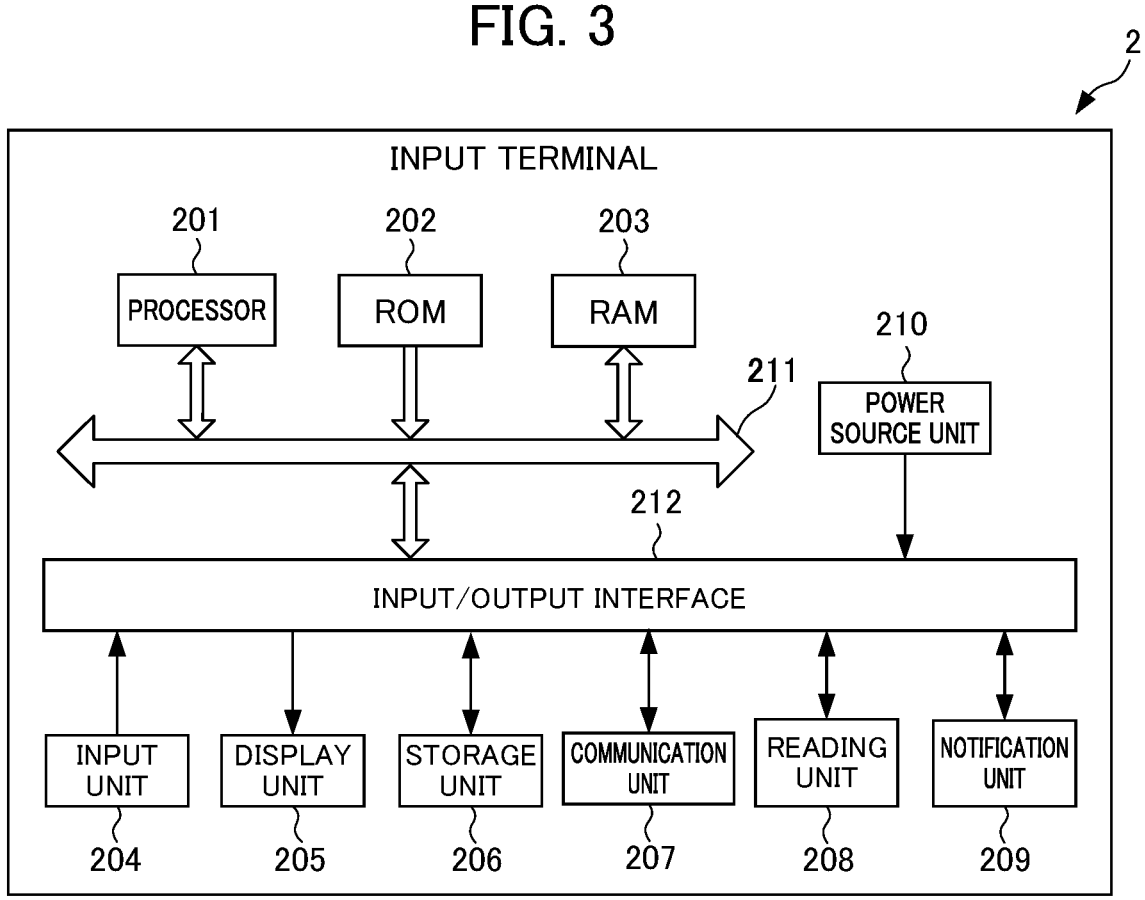
FIG. 3 is a block diagram illustrating a hardware configuration of an input terminal according to an embodiment.

Next, a configuration of the input terminal 2 for implementing the above-described projection system 1 will be described. FIG. 3 is a block diagram illustrating a hardware configuration of the input terminal 2 according to the present embodiment. As illustrated in FIG. 3, the input terminal 2 includes a processor 201, a read only memory (ROM) 202, a random access memory (RAM) 203, an input unit 204, a display unit 205, a storage unit 206, a communication unit 207, a reading unit 208, a notification unit 209, a power source unit 210, a bus 211, and an input/output interface 212.

The processor 201 corresponds to a central part of a computer that performs processing such as calculation and control necessary for the operation of the input terminal 2, and performs various calculations and processing. The processor 201 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. Alternatively, the processor 201 is any combination of a plurality of devices among these units. In addition, the processor 201 may be a combination of these units with a hardware accelerator or the like.

The processor 201 controls each unit to implement various functions of the input terminal 2 based on programs of firmware, system software, application software, and the like, the programs being stored in the ROM 202, the RAM 203, or the like. Furthermore, the processor 201 executes processing, which will be described later, based on the programs. A part or all of the programs may be incorporated in the circuit of the processor 201.

The processor 201, the ROM 202 and the RAM 203 are connected to one another via the bus 211. Moreover, the input/output interface 212 is connected to the bus 211. The input unit 204, the display unit 205, the storage unit 206, the communication unit 207, the reading unit 208, the notification unit 209, the power source unit 210, and the like are connected to the input/output interface 212.

The input unit 204 and the display unit 205 are user interfaces that are to be wiredly or wirelessly electrically connected to the input/output interface 19. The input unit 204 is configured of, for example, a keyboard and a mouse, various buttons, a microphone, or the like, and inputs various kinds of information according to an instruction operation by a user. The display unit 205 is configured of, for example, a display that displays an image thereon, or the like, and outputs the image.

The storage unit 206 is configured of a semiconductor memory such as a dynamic random access memory (DRAM), and stores various types of data.

The communication unit 207 is a device for performing communication among the projector 3, the projection processing device 4, and the other devices (not illustrated) through a network including the Internet.

The reading unit 208 is configured of, for example, a camera, a scanner, or the like, and accepts the input information indicated in the ticket 6. The input information may be, for example, a one-dimensional code, a two-dimensional code, an RFID code, or the like. When the input information is the two-dimensional code, the two-dimensional code may be, for example, a QR code (registered trademark).

The notification unit 209 is a device such as a light-emitting device or a sound output device, for example, for issuing a notification to a user by outputting particular light or sound.

A battery 210 supplies electric power to the input terminal 2. For example, the battery 210 is configured with a lithium-ion battery. Note that when the input terminal 2 is a desktop personal computer, the battery 210 may be capable of supplying the electric power to the input terminal 2 by being connected to an external power source.

<Projector>

Figure 4:
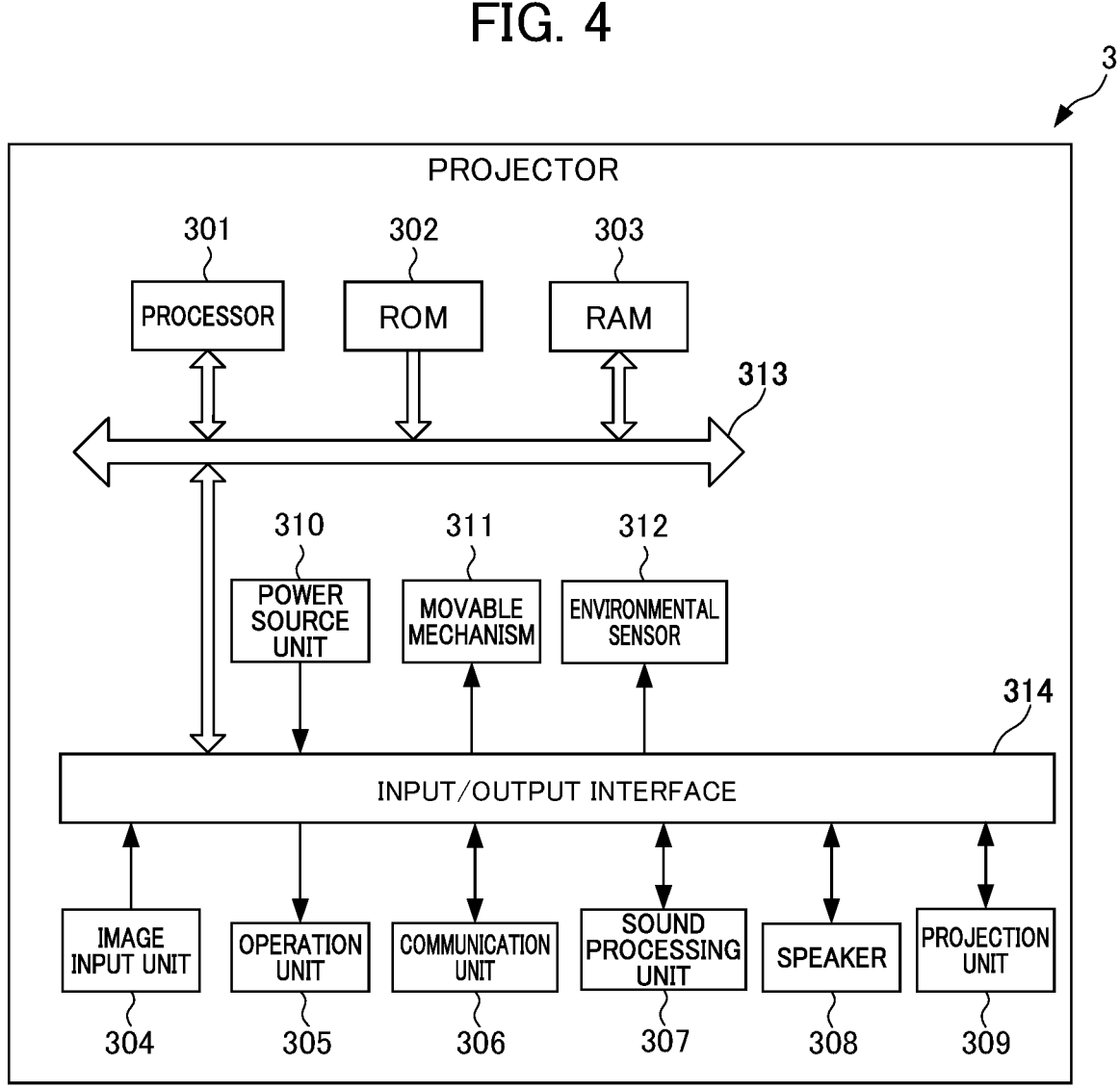
FIG. 4 is a block diagram illustrating a hardware configuration of the projector according to an embodiment.

Next, a configuration of the projector 3 for implementing the above-described projection system 1 will be described. FIG. 4 is a block diagram illustrating a hardware configuration of the projector 3 according to the present embodiment. As illustrated in FIG. 4, the projector 3 includes a processor 301, a ROM 302, a RAM 303, an image input unit 304, an operation unit 305, a communication unit 306, a sound processing unit 307, a speaker 308, a projection unit 309, a power source unit 310, the movable mechanism 311, an environmental sensor 312, a bus 313, and an input/output interface 314. Note that components common with or similar to those already described are denoted by the same names, and detailed description thereof may be omitted.

The image input unit 304 is configured of, for example, a pin jack (RCA) video input terminal, D-sub15 RGB input terminal, a high-definition multimedia interface (HDMI) (registered trademark), a USB terminal, or the like.

The operation unit 305 is configured of, for example, various buttons, or the like, and inputs various kinds of information according to an instruction operation by a user. Alternatively, the operation unit 305 may be a keyboard, a mouse, a remote controller, or the like.

The communication unit 306 is a device for performing communication among the input terminal 2, the projection processing device 4, and the other devices (not illustrated) through the network including the Internet.

The sound processing unit 307 includes a sound source circuit such as a PCM sound source, and converts, into an analog signal, a sound signal provided at the time of a projection operation, and outputs the signal to the speaker 308. The speaker 308 outputs the sound using the sound signal output from the sound processing unit 307.

The projection unit 309 is configured to include a projection image processing unit, a micromirror element, a light source, a mirror, a projection lens, and the like. For example, when image signals are input to the projector 3, the analog or digital image signals based on various kinds of standards are digitized by the image input unit 304 as needed. The projection image processing unit of the projection unit 309 drives the micromirror element with a frame rate complying with a predetermined format, according to the image signals. On the other hand, a light source unit cyclically time-divisionally emits primary color light beams of R, G, and B. The primary color light from the light source unit is totally reflected by the mirror, and the micromirror element is irradiated with the light. An optical image is formed by the light reflected by the micromirror element, and then the formed optical image is projected outside via the projection lens.

The power source unit 310 supplies the electric power to the projector 3 by being connected to the exterior power source.

The movable mechanism 311 has the rotation mechanism, the inclination mechanism, and the like, and allows the projector 3 to be operated based on a control signal output from the projection processing device 4. Specifically, the movable mechanism 311 has the rotation mechanism that causes the projector 3 to be rotated in the horizontal direction perpendicular to the vertical direction based on the operation information included in the control signal, and/or the inclination mechanism that causes the projector 3 to be inclined in a perpendicular direction parallel to the vertical direction, or the like.

The environmental sensor 312 is configured of, for example, an illuminance sensor, a camera, or the like, and acquires information about a surrounding environment of the projector 3. For example, the environmental sensor 312 acquires the illuminance in the specific space 5 as the surrounding environment (environment information) of the projector 3.

<Projection Processing Device>

Figure 5:
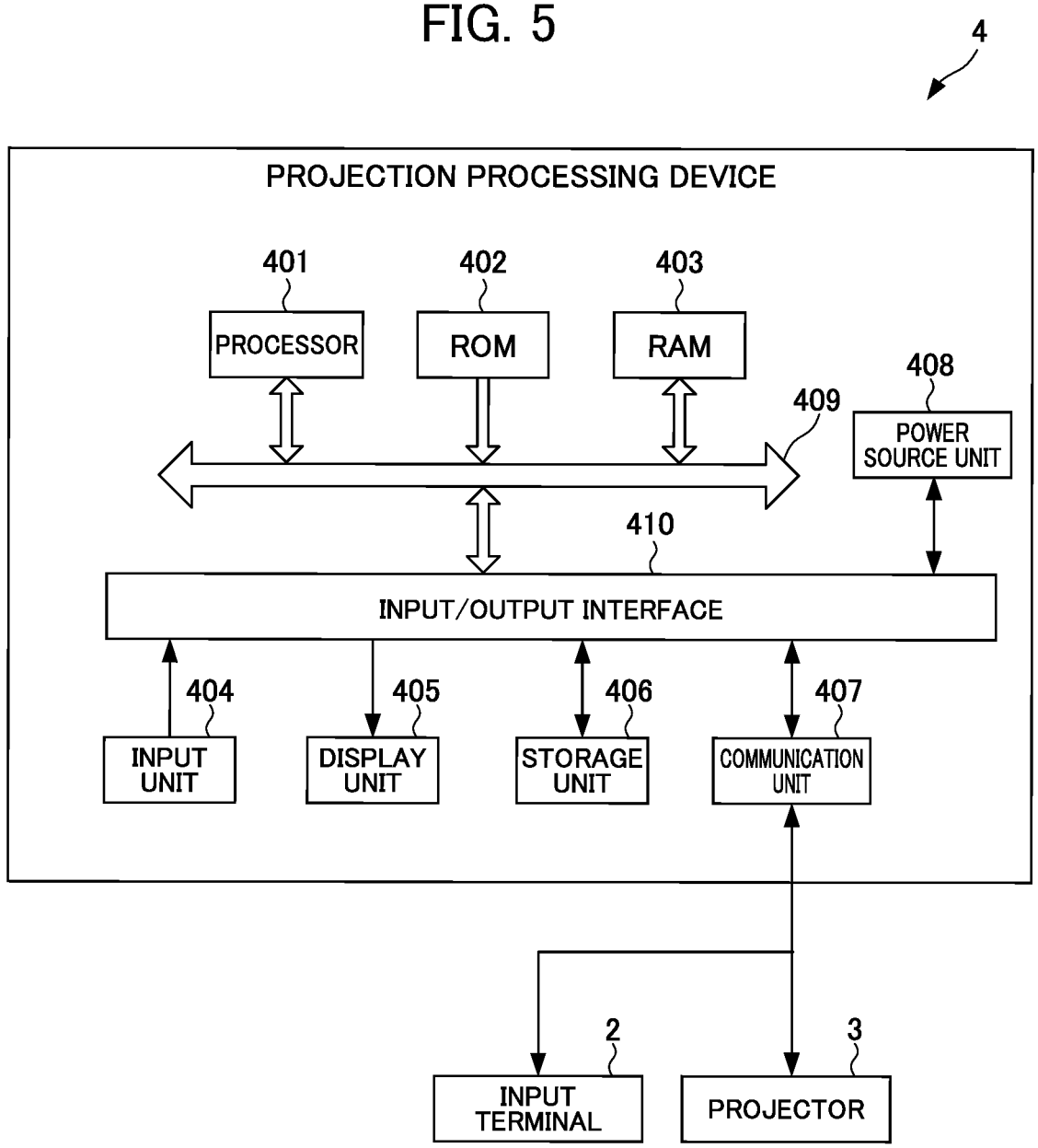
FIG. 5 is a block diagram illustrating a hardware configuration of a projection processing device according to an embodiment.

Next, a configuration of the projection processing device 4 for implementing the above-described projection system 1 will be described. FIG. 5 is a block diagram illustrating a hardware configuration of the projection processing device 4 according to the present embodiment. As illustrated in FIG. 5, the projection processing device 4 includes a processor 401, a ROM 402, a RAM 403, an input unit 404, a display unit 405, a storage unit 406, a communication unit 407, a power source unit 408, a bus 409, and an input/output interface 410. Note that components common with or similar to those already described are denoted by the same names, and detailed description thereof is omitted.

Figure 6:
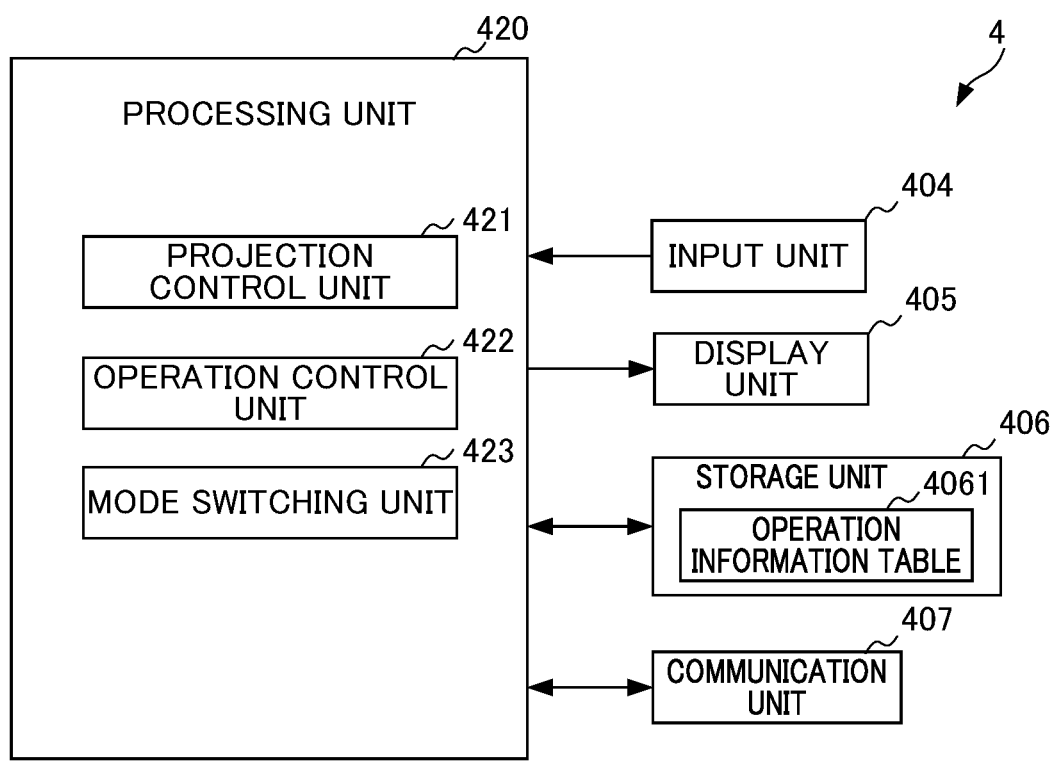
FIG. 6 is a functional block diagram illustrating a part of a functional configuration of the projection processing device according to an embodiment.

Next, a functional configuration of the projection processing device 4 will be described. FIG. 6 is a functional block diagram illustrating a part of a functional configuration of the projection processing device 4 according to the present embodiment. A processing unit 420 that performs various kinds of control of the projection processing device 4 is implemented by the processor 401 that executes calculation processing. The processing unit 420 of the present embodiment includes a projection control unit 421, an operation control unit 422, and a mode switching unit 423.

When the input terminal 2 accepts the input information, the projection control unit 421 causes the projector 3 to project video information enabling a user to identify a position of a seat, based on the projection position information included in the input information.

Here, the projection position information indicates position of seats arranged in the specific space, and the projection position information is stored in an operation information table 4061 in association with the operation information for causing the projector 3 to be operated. The operation information table 4061 is stored in the storage unit 406.

The projector 3 can project the video information on all of the seats arranged in the specific space, and the projection control unit 421 causes the projector 3 to project the video information on a specific seat position in the specific space. For example, the projection control unit 421 causes the projector 3 to project the video information on an upper portion of a user's seat position in the specific space. This enables the user to easily know the user's own seat position in the specific space in which many seats are present.

The projection control unit 421 causes the projector 3 to adjust the illuminance when the video information is projected, based on the information about the surrounding environment acquired by the environmental sensor 312 of the projector 3. For example, the projection control unit 421 controls the projector 3 so that the illuminance when the video information is projected is increased, in the case where the illuminance in the specific space acquired by the environmental sensor 312 is equal to or larger than a certain condition (e.g., the standard illuminance in the room). The projection control unit 421 controls the projector 3 so that the illuminance when the video information is projected is not changed (or is maintained), in the case where the illuminance in the specific space acquired by the environmental sensor 312 is less than the predetermined condition.

The operation control unit 422 generates a control signal for controlling the movable mechanism 311 based on the operation information associated with the projection position information included in the input information, and outputs the control signal to the movable mechanism 311. Specifically, the operation control unit 422 reads, from the operation information table 4061, the operation information associated with the projection position information included in the input information, and generates a control signal for controlling the movable mechanism 311 based on the read operation information, and outputs the control signal to the movable mechanism 311.

The mode switching unit 423 is switchable between a seat instructing mode in which the projector 3 projects the video information on a specific seat position in the specific space and another mode (e.g., a standby mode) other than the seat instructing mode. Here, the standby mode is a mode for projecting predetermined still, moving images, and the like including advertisements on a specific place (which may be a stage curtain, a front screen, or the like) different from the seats in the specific space, for example. Alternatively, the mode switching unit 423 may be switchable into a mode other than the standby mode as another mode.

FIG. 7 is a diagram illustrating the operation information table 4061 according to the present embodiment. As illustrated in FIG. 7, the operation information table 4061 stores, therein, the projection position information indicating positions of seats arranged in the specific space in association with the operation information for causing the projector 3 to be operated. This enables the projection system 1 to project the video information for each seat.

Figure 8:
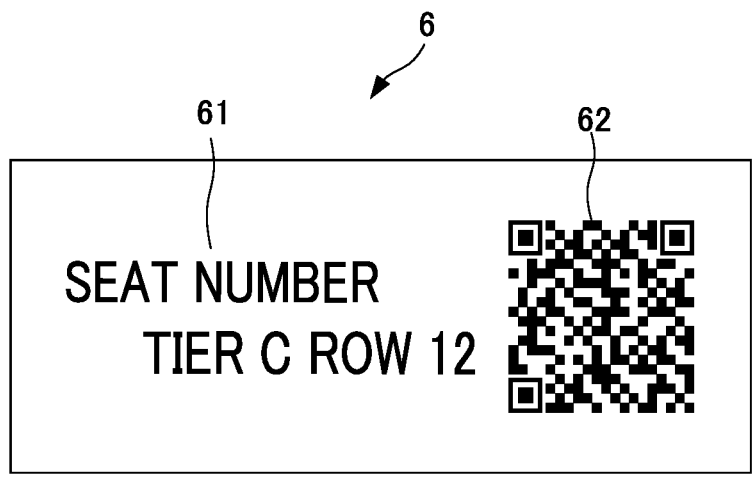
FIG. 8 is a diagram illustrating an example of the projection position information indicated in a ticket according to an embodiment.

FIG. 8 is a diagram illustrating an example of the projection position information indicated in the ticket 6 according to the present embodiment. As illustrated in FIG. 8, on the ticket 6, there are printed the projection position information 61 as character information to be visually recognized by a user, and the input information 62 to be input to (or to be read from) the input terminal 2.

Note that, in the example illustrated in FIG. 8, the input information 62 is formed by a QR code, but the input information 62 is not limited thereto. A medium in which the input information 62 is indicated is not limited to the ticket 6, and therefore, for example, the input information 62 may be displayed on a display of the mobile terminal or the input information 62 stored in the RFID may be read by the input terminal 2.

<Projection Processing>

Figure 9:
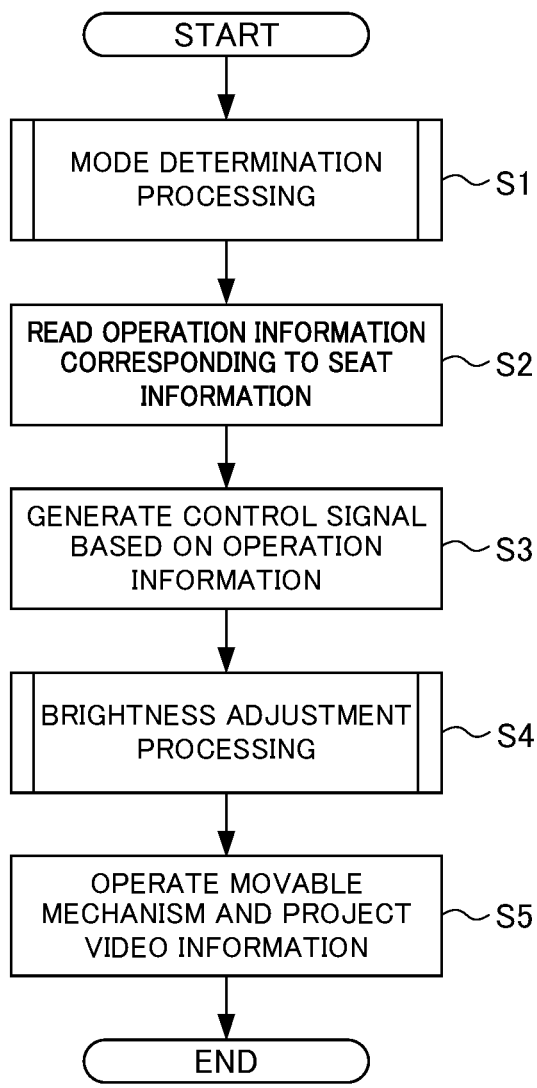
FIG. 9 is an example of a flowchart illustrating a flow of projection processing to be executed by the projection processing device of an embodiment.
Figure 10:
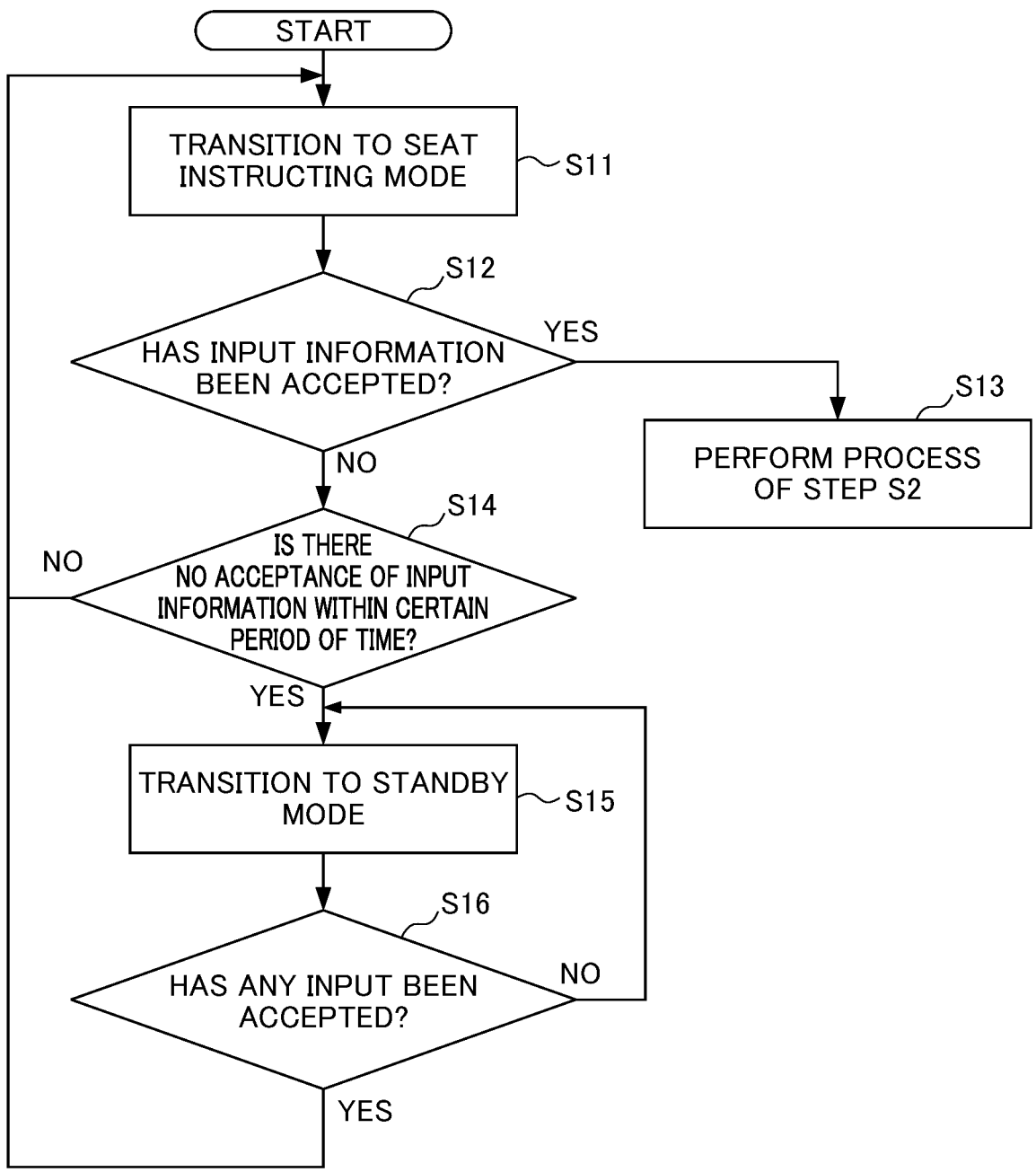
FIG. 10 is a flowchart illustrating mode determination processing in the flowchart illustrated in FIG. 9.
Figure 11:
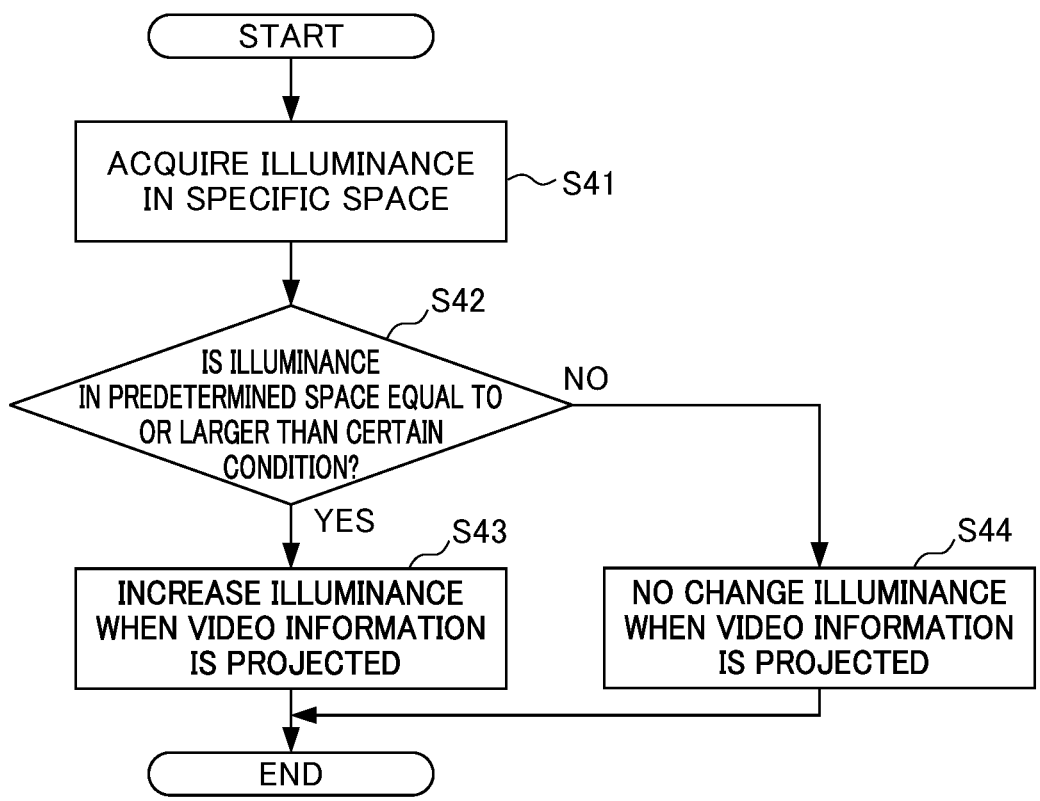
FIG. 11 is a flowchart illustrating brightness adjustment processing in the flowchart illustrated in FIG. 9.

Next, an example of projection processing will be described with reference to FIGS. 9 to 11. FIGS. 9 to 11 each are an example of a flowchart illustrating a flow of the projection processing to be executed by the projection processing device 4 of the present embodiment. First, the mode switching unit 423 executes mode determination processing to accept the input information from the input terminal 2 (step S1).

Next, when the input information is accepted from the input terminal 2, the projection control unit 421 accesses the operation information table 4061, and reads the operation information associated with the projection position information included in the input information (step S2). Next, the operation control unit 422 generates a control signal for controlling the movable mechanism 311 based on the read operation information, and outputs the control signal to the movable mechanism 311 (step S3).

Next, the projection control unit 421 executes brightness adjustment processing that causes the projector 3 to adjust the illuminance when the video information is projected, based on the information about the surrounding environment acquired by the environmental sensor 312 of the projector 3 (step S4).

Next, the projection control unit 421 causes the projector 3 to project the video information enabling a user to identify a position of a seat, based on the projection position information included in the input information and the illuminance adjusted in the brightness adjustment processing. Accordingly, the projector 3 causes the movable mechanism 311 to be operated based on the operation information included in the control signal, and projects the video information based on the projection position information (step S5).

FIG. 10 is a flowchart illustrating the mode determination processing in the flowchart illustrated in FIG. 9. First, the mode switching unit 423 transitions to the seat instructing mode in which the projector 3 projects the video information on a specific seat position in the specific space, as a default state (step S11).

Next, the mode switching unit 423 determines whether the input information has been accepted (step S12). When the input information has been accepted (step S12: YES), the mode switching unit 423 performs the process of step S2 in the flowchart of FIG. 9 (step S13).

When the input information has not been accepted (step S12: NO), the mode switching unit 423 determines whether there is no acceptance of the input information within a certain period of time (step S14). When there is no acceptance of the input information within the certain period of time (step S14: YES), the mode switching unit 423 transitions to the standby mode (step S15).

When the input information has been accepted within the certain period of time (step S14: NO), the mode switching unit 423 transitions to the seat instructing mode (step S11). The mode switching unit 423 determines whether any input other than the input information has been accepted during the standby mode (step S16). When any input (including acceptance of the input information from the input terminal, or the like) for terminating the standby mode has been accepted (step S16: YES), the mode switching unit 423 transitions to the seat instructing mode (step S11). When any input has not been accepted (step S16: NO), the mode switching unit 423 returns the process to step S15 again.

FIG. 11 is a flowchart illustrating the brightness adjustment processing in the flowchart illustrated in FIG. 9. First, the environmental sensor 312 acquires illuminance in the specific space (step S41).

Next, the projection control unit 421 determines whether the acquired illuminance in the specific space is equal to or larger than the certain condition (step S42). When the illuminance is equal to or larger than the predetermined condition (step S42: YES), the projection control unit 421 controls the projector 3 so that the illuminance when the video information is projected is increased (step S43). When the illuminance is less than the certain condition (step S42: NO), the projection control unit 421 controls the projector 3 so that the illuminance when the video information is projected is not changed (or is maintained) (step S44).

As described above, according to the present embodiment, a projection system 1 includes an input terminal 2 that accepts input information, a projector 3 that projects an image in a specific space 5, and a projection processing device 4 that is configured to be capable of communicating with the input terminal 2 and the projector 3 and controls the input terminal 2 and the projector 3. The projection processing device 4 has a projection control unit 421 that acquires, in response to acceptance of input information from the input terminal 2, projection position information associated with the input information and to instruct the projector 3 to emit light or project an image enabling a user to identify a position in the specific space based on the acquired projection position information. This enables the projection system 1 to project video information enabling a user to identify a position of a seat, whereby the user can easily know the user's own seat position in the specific space.

The projection position information indicates position of seats arranged in the specific space 5, and the projection position information is stored in association with the operation information for causing the projector 3 to be operated. The projector 3 has a movable mechanism 311 that causes the projector 3 to be operated based on the operation information associated with the projection position information. Accordingly, the projection system 1 uses the movable mechanism 311 to cause the projector 3 to be moved to a proper position, whereby the projector 3 can project the video information.

In addition, the movable mechanism 311 is controlled by the projection processing device 4 so that the projector 3 is rotated in the horizontal direction perpendicular to the vertical direction and the projector 3 is inclined in the perpendicular direction parallel to the vertical direction based on the operation information. Accordingly, the projection system 1 can move the projector 3 to a proper position to project the video information.

The projector 3 can project the video information on all of the seats arranged in the specific space 5, and the projection control unit 421 causes the projector 3 to project the video information on a specific seat position in the specific space 5. This enables the projection system 1 to properly project the video information on a seat designated by a user in the specific space 5.

The projector 3 further has an environmental sensor 312 that acquires information of a surrounding environment, and the projection control unit 421 determines illuminance when the projector 3 emits light or projects an image, based on the environmental information indicating the surrounding environment in the specific space acquired by the environmental sensor 312. Accordingly, the projection system 1 does not change the illuminance of the video information when the specific space is, for example, a movie theater, and the illuminance in the movie theater is low, and the projection system 1 can increase the illuminance of the video information so that the video information can be easily recognized by a user when the illuminance in the movie theater is sufficiently large.

The projection system 1 further has a mode switching unit 423 that is switchable between a seat instructing mode in which the projector 3 projects the video information on a specific seat position in the specific space 5 and another mode other than the seat instructing mode. Accordingly, the projection system 1 can use the projector 3 to project information related to a movie and the like when the specific space is, for example, a movie theater, which makes it possible to execute processing other than projecting the video information.

Alternatively, the mode switching unit 423 may switch into a mode for performing projection different from that the standby mode of the above-described embodiment. For example, the mode switching unit 423 may switch into a mode in which the projector 3 functions as illumination of a stage, a show, or the like. In this case, the projector 3 may be provided on the stage side.

<Modification Example>

It is noted that the present disclosure is not limited to the above-described embodiments, and includes modifications, improvements, and the like within the scope which can achieve the object of the present disclosure.

For example, the movable mechanism 311 may have a rail mechanism that causes the projector 3 to be moved in the horizontal direction perpendicular to the vertical direction based on the operation information. Accordingly, the projection system 1 causes the projector 3 to be moved to a proper position, whereby the projector 3 can project the video information.

The projector 3 may further have a reflective mirror that adjusts a projection angle of projecting the video information. This enables the projection system 1 to project the video information from the adjusted proper angle.

In the above-described embodiment, there has been described the case where the input terminal 2 is provided in one place, but a plurality of input terminals 2 may be provided when the specific space have a large area. However, in this case, when the plurality of input terminals 2 accept respective pieces of input information at the same time, a plurality of pieces of video information are to be projected by the projector 3, which makes it difficult for a user to distinguish among the plurality of pieces of video information.

Then, in the case where there are a plurality of input terminals 2, the projection control unit 421 instructs the projector 3 to emit light or project an image at determined brightness based on the projection position at which the video information is to be projected or the timing when the input information is accepted. That is, the projection control unit 421 performs control to cause the projector 3 to change a mode in which the video information is to be projected. The input terminal 2 further has a notification unit 209 that issues a notification in a predetermined sound and/or light mode, and the notification unit 209 issues a notification in the predetermined mode in conjunction with the projection of the video information by the projector 3.

Specifically, the projection control unit 421 sets a plurality of different flashing patterns corresponding to the respective input terminals 2, and projects the video information using the plurality of different flashing patterns based on the projection position at which the video information is to be projected or the timing when the input information is accepted. Furthermore, the notification unit 209 outputs light and/or sound in conjunction with (in synchronization with) the projection of the video information by the projector 3.

Alternatively, the projection control unit 421 may set a plurality of different colors corresponding to the respective input terminals 2 instead of the plurality of different flashing patterns, and may project the video information using the plurality of colors. This enables the projection system 1 to project the video information enabling a user to identify the user's own seat position even when the plurality of input terminals 2 are provided.

Alternatively, the projection control unit 421 may three-dimensionally project the video information, for example, in projection mapping, on the seat corresponding to the projection position information in the specific space. This enables the user to more clearly identify the user's own seat position.

Alternatively, the projection control unit 421 may cause the projector 3 to project, as the video information, character information enabling a user to identify the projection position information. Specifically, the projection control unit 421 may cause the projector 3 to project, as the video information, the character information of a seat number, a name, a handle name, or the like. This enables the user to more clearly identify the user's own seat position.

In the above-described embodiment, there has been described the case where the projector 3 is provided in one place, but a plurality of projectors 3 may be provided. Alternatively, the projection control unit 421 may control the projector 3 so that the projection of the projection information is terminated after a certain period of time has elapsed since projection of the video information. The input terminal 2 may authenticate a user using face authentication or the like before the input information is accepted.

In the above-described embodiment, the projection control unit 421 performs control so that the projector 3 projects the video information enabling a user to identify the seat position, but the video information is not limited to the seat position, and may be information enabling a user to identify the user's standing position, or a position of an exhibit that a user desires to view, when the specific space is, for example, a museum or an art museum.

When the specific space is a waiting room of a hospital, the projection control unit 421 may control the projector 3 so that the video information is projected on a plurality of seats that are present within a certain range, to guide a user to the seats in the certain range.

In the above-described embodiment, the projection control unit 421 causes a projector to project, on a specific seat, an image enabling a user to identify a position in a specific space based on the projection position information, but a place on which the video information is to be projected is not limited to a seat. For example, the projection control unit 421 may control the projector 3 so that the video information is projected on a position of a move destination to which the user moves. Alternatively, the projector 3 may be a spotlight that emits light, as the video information, enabling the user to identify the position in the specific space. The projection control unit 421 may instruct the projector 3 to emit light or project an image enabling the user to identify a position of a work of art introduced in the specific space as the position in the specific space.

The above-described series of processing can be executed by hardware or can be executed by software. In other words, the functional configuration in FIG. 6 is merely illustrative, and is not particularly limited. That is, it is only necessary that the projection processing device 4 has functions that can execute the above-described series of processing as a whole, and what kind of functional blocks are used to implement the functions is not particularly limited to the example in FIG. 6.

<Other Embodiments>

Figure 12:
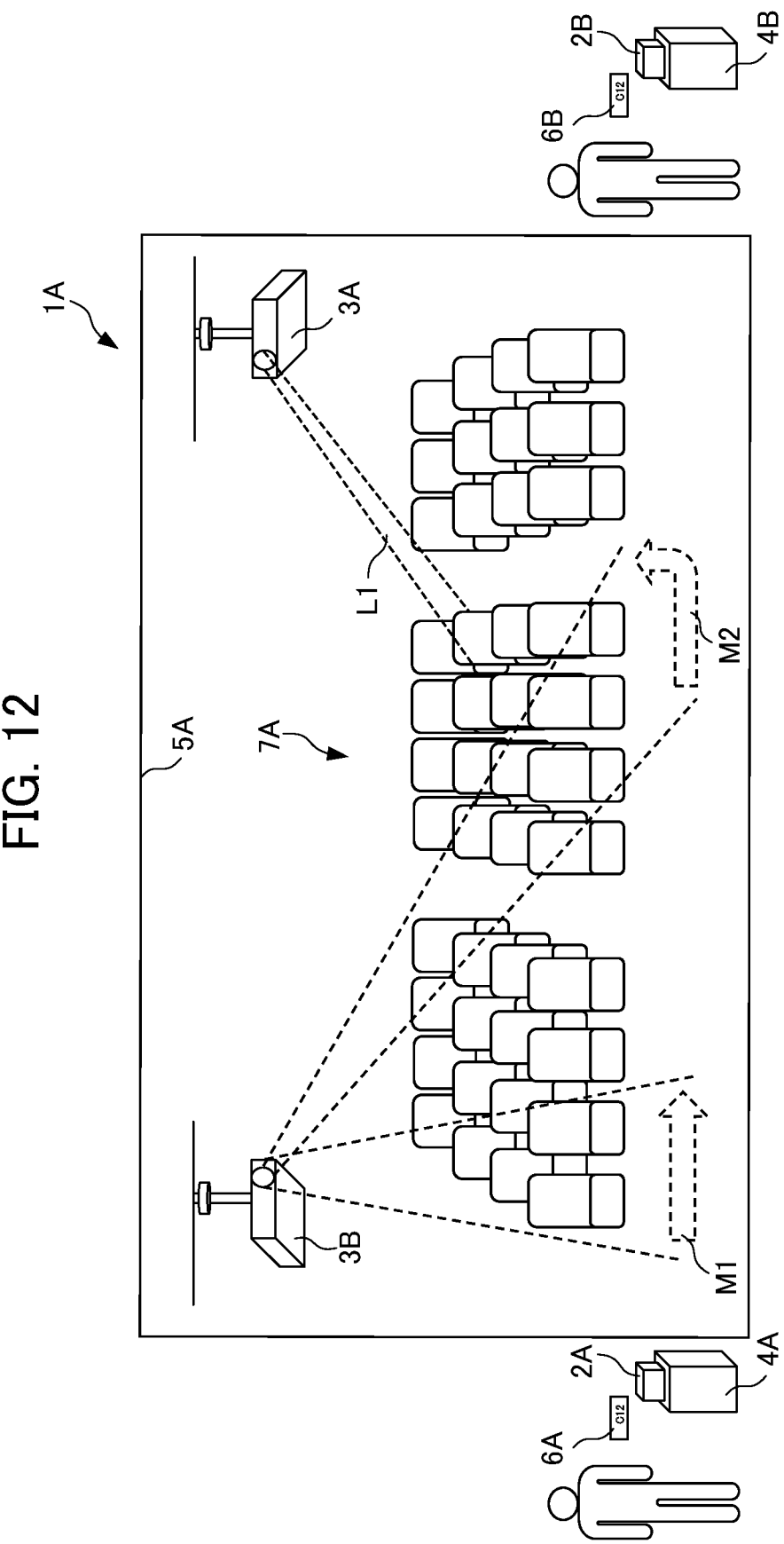
FIG. 12 is a schematic diagram illustrating a projection system according to another embodiment.

FIG. 12 is a schematic diagram illustrating a projection system 1A according to another embodiment. As illustrated in FIG. 12, the projection system 1A includes an input terminal 2A, an input terminal 2B, a projector 3A, a projector 3B, a projection processing device 4A, and a projection processing device 4B. That is, the projection system 1A is different from the above-described embodiment in that the two projectors 3A and 3B are controlled. Note that the other configuration of the projection system 1A is the same as that of the above-described projection system 1. Note that the projection processing device 4A and the projection processing device 4B can communicate with each other, and the projector 3A and the projector 3B may be controlled by both of the projection processing device 4A and the projection processing device 4B. Alternatively, the projector 3A and the projector 3B may be controlled by the projection processing device 4A or the projection processing device 4B.

In the projection system 1A, the input terminal 2A acquires input information from a ticket 6A, and a projection control unit 421 of the projection processing device 4A determines that the two projectors 3A and 3B are used, based on projection position information included in the input information, when accepting the input information from the input terminal 2A. The projection control unit 421 causes the determined two projectors 3A and 3B to project or emit the video information enabling a user to identify a position of a seat.

Specifically, as illustrated in FIG. 12, the projection control unit 421 determines, based on the projection position information, the projector 3B closer to the input terminal 2A that has accepted the input information from the ticket 6A, i.e., the projector 3B farther from a seat position of the user having the ticket 6A, as a projector for projecting images M1 and/or M2 enabling the user to identify a route to the seat position. In addition, the projection control unit 421 determines, based on the projection position information, the projector 3A farther from the input terminal 2A that has accepted the input information from the ticket 6A, i.e., the projector 3A closer to the seat position, as a projector emitting light L1 enabling the user to identify the seat position. Note that the projection control unit 421 may determine, using another method, a projector for projecting the images M1 and/or M2 enabling the user to identify the route to the seat position, and a projector for emitting the light L1 enabling the user to identify the seat position.

Then, the projection control unit 421 causes the determined projector 3B to project the images M1 and/or M2 enabling the user to identify the route to the seat position in a specific space 5A and causes the determined projector 3A to emit the light L1 enabling the user to identify the seat position in the specific space 5A.

Here, the projection control unit 421 first causes the projector 3B to project the image M1 on a passage at a position closer to the input terminal 2A, when accepting the input information from the input terminal 2A. The image M1 is an image that indicates a route from the position of the input terminal 2A to the seat position and has an arrow shape.

Next, the operation control unit 422 generates a control signal for changing a projection position by a movable mechanism 311 based on the operation information associated with the projection position information, and outputs the control signal to the movable mechanism 311. The projection control unit 421 causes the projector 3B to project the image M2 on a passage at a position closer to the seat position, instead of the image M1. The image M2 is an image that indicates a route from the passage to the seat position and has an arrow shape. The timing of switching from the image M1 to the image M2 may be determined using a timer built in the projection processing device 4A or may be determined using a detection unit such as various sensors or a camera.

Next, the projection control unit 421 causes the projector 3B to stop the projection of the image M1 and causes the projector 3A to emit the light L1 enabling the user to identify the seat position. With such a configuration, the projection system 1A provides the seat information including both of the seat position and the route to the seat position to the user having the ticket 6A, whereby the user can arrive at the user's own seat without losing the way in the specific space 5A. In addition, the timing of projecting the images M1 and/or M2 enabling the user to identify the route to the seat position in the specific space 5A may be the same as the timing of emitting the light L1 enabling the user to identify the seat position in the specific space 5A. In the above-described embodiment, the projection system 1A projects the images M1 and/or M2 and emits the light L1 using the two projectors 3A and 3B, but may be configured to project the images M1 and/or M2 and emit the light L1 using any one of the projectors 3A and 3B.

Alternatively, the projection control units 421 may accept, from the two different input terminals 2A and 2B, respective pieces of input information, determine that the two projectors 3A and 3B are used based on the positions of the two input terminals 2A and 2B that have accepted the respective pieces of input information, and cause the determined two projectors 3A and 3B to project respective pieces of video information enabling users to identify seat positions.

Specifically, the projection control units 421 of the input terminals 2A and 2B may determine, based on positions of the two input terminals 2A and 2B that have accepted the respective pieces of input information, one projector that is present at a short distance from each position of the input terminals 2A and 2B that have accepted the respective pieces of input information, and instruct the determined projector to emit light or project an image enabling the user to identify the seat position.

For example, when having accepted the respective pieces of input information from both of the input terminals 2A and 2B, the projection control units 421 determine to cause the projector 3B closer to the position of the input terminal 2A to project the video information for the user using the input terminal 2A, and determine to cause the projector 3A closer to the position of the input terminal 2B to project the video information for the user using the input terminal 2B. Then, the projection control units 421 cause the projector 3B to project the video information for the user using the input terminal 2A (i.e., the user having the ticket 6A) and causes the projector 3A to project the video information for the user using the input terminal 2B (i.e., the user having the ticket 6B).

With such a configuration, the projection system 1A controls the plurality of projectors in conjunction with each other according to the position of the input terminal that has accepted the input information from the ticket, which makes it possible to efficiently present to the user the seat position of the user in the specific space 5A.

The projection control units 421 may cause the projector 3A closer to the position of the input terminal 2B to project the information prompting the user to stand by (e.g., an image indicating characters "please wait for a while" or a sign image indicating no entry) in the vicinity of the input terminal 2B while causing the projector 3B closer to the position of the input terminal 2A to project the video information, for example.

In the example illustrated in FIG. 12, the projection control units 421 cause the projector 3B to project the images M1 and M2 and emit the light L1 as the video information enabling the user to identify the seat position, but may cause the projector 3B to project and/or emit another image and/or the light.

For example, when the input terminal 2A accepts the input information of the ticket 6A and the seat corresponding to the seat position information included in the input information is not present in the plurality of seats 7A, the projection control units 421 may cause the projector to project the image indicating no entry in the vicinity of the input terminal 2A. Projecting such an image enables the projection system 1A to suggest to the user that an entrance in the vicinity of the input terminal 2A is wrong, and to prompt the user to move to another input terminal (another entrance).

Furthermore, in the example illustrated in FIG. 12, the projection control units 421 cause the projectors 3A and 3B to project and/or emit the video information, but the projection control units 421 may further cause the input terminals 2A and 2B to output the sound.

For example, when the input terminal 2A accepts the input information, the projection control units 421 cause the input terminal 2A to output the sound in a first tone. Furthermore, the projection control units 421 cause the projector 3B to project light in a first flashing pattern in synchronization with the output of the first tone.

Similarly, when the input terminal 2B accepts the input information, the projection control units 421 cause the input terminal 2B to output the sound in a second tone different from the first tone. Furthermore, the projection control units 421 cause the projector 3B to project light in a second flashing pattern different from the first flashing pattern in synchronization with the output of the second tone.

With such a configuration, the projection system 1A notifies the user of the seat position not only by flashing the light using the projectors 3A and 3B but also using the sound from the input terminals 2A and 2B. Therefore, the user recognizes the seat where the output of sound from the input terminal 2A or 2B coincides (synchronizes) with the flashing of light using the projector 3A or 3B, which makes it possible for the user to arrive at the user's own seat without losing the way in the specific space 5A.

The above-described projection system 1A synchronizes the output of sound from the input terminal 2A or 2B with the flashing of light using the projector 3A or 3B to be distinguishable from another output of sound and another flashing of light, but another method may be used.

For example, the projection control unit 421 may cause the display unit 205 of the input terminal 2A and 2B to display a specific color so that the color displayed on the display unit 205 of the input terminal 2A or 2B coincides with a color of an image projected by the projector 3A and 3B. Therefore, the user recognizes the seat where the color of the input terminal 2A or 2B coincides with the color of the image by the projector 3A or 3B, which makes it possible for the user to arrive at the user's own seat without losing the way in the specific space 5A.

In the example illustrated in FIG. 12, the projection system 1A uses the two projectors 3A and 3B, but the projection system 1A may be configured to arrange three or more projectors in the specific space 5A and determine at least two projectors among the three or more projectors.

Each of the two or more projectors may have a projection range for emitting the light or projecting the image in the specific space 5A, and the specific space 5A may be fully divided into each projection range, and the projection ranges may partially overlap with each other in the specific space 5A.

Figure 13:
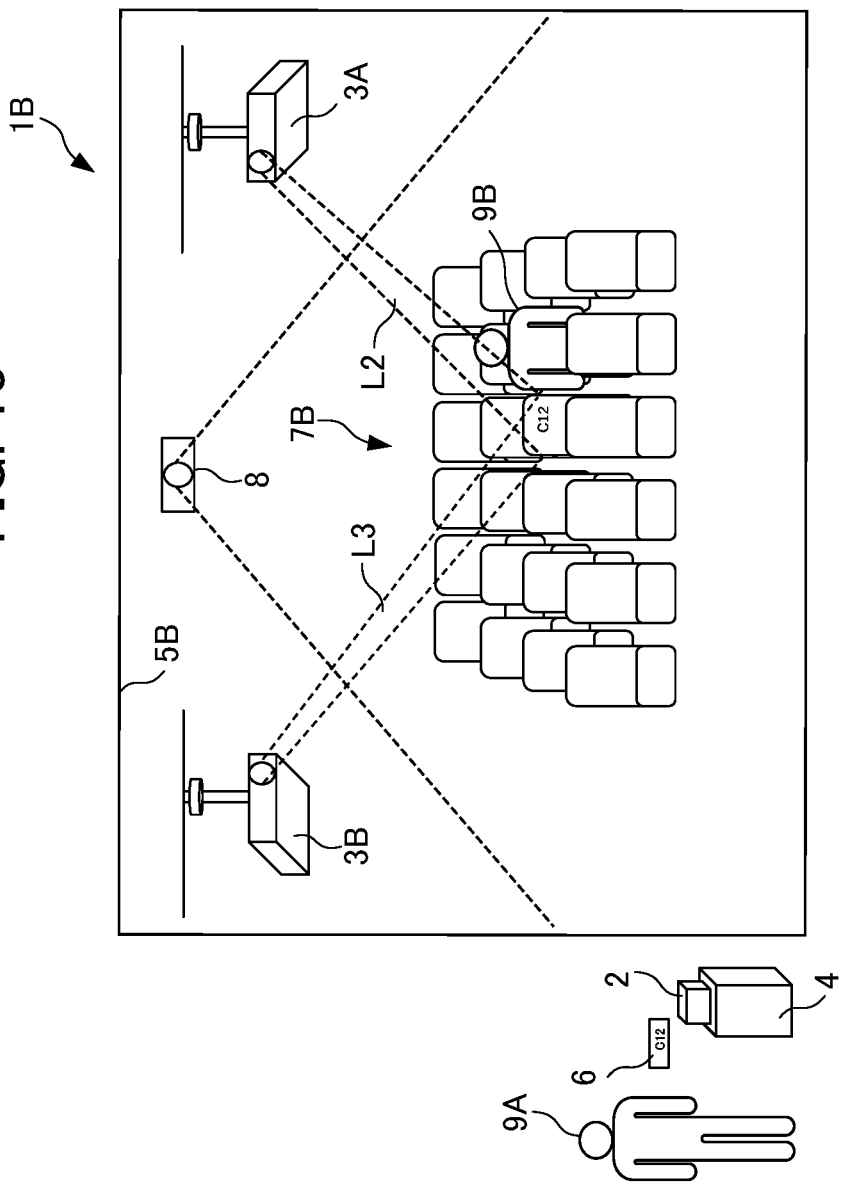
FIG. 13 is a schematic diagram illustrating a projection system according to still another embodiment.

FIG. 13 is a schematic diagram illustrating a projection system 1B according to still another embodiment. As illustrated in FIG. 13, the projection system 1B includes an input terminal 2, a projector 3A, a projector 3B, a projection processing device 4, and a camera 8.

That is, the projection system 1B is different from the above-described embodiment in that the camera 8 is provided as a detection unit configured to detect an obstacle that the projectors 3A and the projector 3B in a direction in which the projector 3A and 3B emits the light or projects the image. Note that the other configuration of the projection system 1B is the same as that of the above-described projection system 1 and 1A. The projection control unit 421 of the projection processing device 4 determines that the two projectors 3A or 3B are used, based on the detection of an obstacle by the camera 8.

Specifically, the camera 8 captures an image of the entirety of a plurality of seats 7B in the specific space 5B. The projection control unit 421 determines to cause the projector 3A closer to the seat position to emit light L2 enabling a user 9A using the input terminal 2 to identify the seat position. Then, the projection control unit 421 causes the projector 3A to emit the light L2 on a seat "C12".

Here, the projection control unit 421 determines which seat another user (obstacle) occupies among the plurality of seats 7B, based on the image captured by the camera 8. Furthermore, the projection control unit 421 determines whether another user inhibits the projection when the projector 3A emits the light, based on the information about the seat that another user occupies.

In the example illustrated in FIG. 13, the projection control unit 421 determines that a user 9B sitting adjacent to the seat "C12" inhibits the emission of light from the projector 3A, based on the image captured by the camera 8. In this case, the projection control unit 421 causes the projector 3B, instead of the projector 3A, to emit light L3 on the seat "C12". With such a configuration, the projection system 1B can avoid the use of the projector 3A, the projection or emission of the video information from which is inhibited, and can switch into the projection or emission of the video information from the projector 3B.

In the example illustrated in FIG. 13, the projection system 1B uses the two projectors 3A and 3B, but the projection system 1B may be configured to arrange a larger number of projectors and provide at least one projector, the projection of the image from which is not inhibited even when a person occupies any seat.

As described above, the movable mechanism 311 adjusts the projection angle of the image using the rail mechanism for moving the projector 3 in the horizontal direction perpendicular to the vertical direction, the reflective mirror that adjusts the projection angle of projecting the video information, or the like, whereby the projection system 1B may perform control so that another user does not inhibit the projection of the image.

The projection system 1B may determine, instead of the camera 8, at least one projector, the projection of the image from which is not inhibited, based on the setting of a preset table, or the like. For example, the preset table may be stored in association with the input terminal 2 and the projector, the projection of the image from which is not inhibited. When the input information is accepted from the input terminal 2, the projection control unit 421 may refer to the preset table and determine the projector associated with the input terminal 2, as at least one projector, the projection of the image from which is not inhibited.

Furthermore, the projection control unit 421 may determine at least one projector, the projection from which is not inhibited, based on the positional relationship of the seats and the relationship with the accepted seat. For example, the projection control unit 421 acquires the position of the accepted seat in the ticket 6 already accepted by the input terminal 2. Then, the projection control unit 421 compares the new seat position accepted newly and the accepted seat position, and selects the projector. The criteria for selecting the projector is preset according to the positional relationship between the new seat position and the accepted seat position. In other words, in this configuration, the projection control unit 421 functions as a detection unit configured to detect an obstacle, which makes it possible to execute the same control as that in FIG. 13 even without providing the camera 8.

In addition, one functional block may include hardware alone, software along, or a combination thereof. The functional configuration in the present embodiment is achieved by a processor that executes calculation processing, and the processor that can be used in the present embodiment is configured by units of various processing devices such as a single processor, a multiprocessor, and a multicore processor. In addition thereto, a combination of these various processing devices and a processing circuit such as an application specific integrated circuit (ASIC) or a field-programmable gate array (FPGA) is included.

When a series of processing is executed by software, a program included in the software is installed on a computer or the like from a network or a recording medium. The computer may be a computer incorporated in dedicated hardware. Alternatively, the computer may be a computer capable of executing various functions by installing various programs, for example, a general-purpose personal computer.

The recording medium having such programs includes a removable medium distributed separately from a device main body to provide the programs to the user, and includes a recording medium or the like provided to the user in a state of being incorporated in the device main body in advance. For example, the removable medium includes a magnetic disk (including a floppy disk), an optical disc, a magneto-optical disk, or the like. For example, the optical disc includes a compact disk-read only memory (CD-ROM), a digital versatile disk (DVD), a Blu-ray (registered trademark) Disc, or the like. The magneto-optical disk includes a mini-disk (MD), or the like. In addition, the recording medium provided to the user in the state of being incorporated in the device main body in advance includes, for example, the ROM 202 of FIG. 3 in which the programs are recorded, the hard disk included in the storage unit 206 of FIG. 3, or the like.

In this specification, steps of describing the programs to be recorded on a recording medium naturally include processing performed in time series in order and include processing executed in parallel or individually even when the processing is not necessarily in time sequence. The projection processing device may be included in the input terminal. The projection processing device may be included in the projector.

As described above, even though several embodiments of the present disclosure have been described, these embodiments are merely illustrative and do not limit the technical scope of the present disclosure. The present disclosure can take other various embodiments, and various modifications such as omission and replacement can be made without departing from a gist of the present disclosure. These embodiments and modifications thereof are included in the scope or gist of the disclosure described in this specification and the like, and are included within the scope of the disclosure described in the claims and equivalents thereof.

What is claimed is:

1. A projection processing device, comprising a processor that acquires, in response to acceptance of input information, projection position information associated with the input information, and instructs a projector to emit light or project an image enabling a user to identify a position based on the acquired projection position information,
wherein the projection processing device further comprising:
 a detection unit that detects an obstacle in a direction in which the projector emits light or projects the image,
 wherein the processor determines at least one of the projectors among a plurality of the projectors, based on detection of the obstacle by the detection unit.

2. The projection processing device according to claim 1, wherein the processor instructs the projector to emit light or project the image enabling the user to identify the position in a specific space based on the acquired projection position information.

3. The projection processing device according to claim 1, wherein the projection position information is stored in association with operation information for causing the projector to be operated.

4. The projection processing device according to claim 3, wherein the processor performs control so that the projector is rotated in a horizontal direction perpendicular to a vertical direction and is inclined in a perpendicular direction parallel to the vertical direction, based on the operation information.

5. The projection processing device according to claim 1, wherein the processor instructs the projector to emit light or project the image at brightness determined based on timing when the input information is accepted.

6. The projection processing device according to claim 1, wherein the processor determines illuminance when the projector emits light or projects the image based on environmental information.

7. The projection processing device according to claim 6, wherein the processor determines illuminance when the projector emits light or projects the image based on environmental information in a specific space.

8. The projection processing device according to claim 1, wherein the projector comprises a plurality of projectors, and
 the processor
  determines at least two of the projectors among a plurality of the projectors based on the projection position information associated with the input information, and
  instructs at least one of the determined projectors to emit light or project the image.

9. The projection processing device according to claim 8, wherein the processor instructs a plurality of the projectors to emit light or project the image in cooperation with one another.

10. The projection processing device according to claim 8, wherein the processor
 instructs one of the determined projectors to emit light or project an image enabling a user to identify a seat position in a specific space, and
 instructs the other of the determined projectors to emit light or project the image enabling the user to identify a route to the seat position in the specific space.

11. A projection system, comprising:
an input terminal that accepts input information presented by a user;
a projector; and
a projection processing device having a processor that acquires, in response to acceptance of the input information, projection position information associated with the input information, and instructs the projector to emit light or project an image enabling a user to identify a position based on the acquired projection position information,
wherein the projection processing device further comprising:

a detection unit that detects an obstacle in a direction in which the projector emits light or projects the image, wherein the processor determines at least one of the projectors among a plurality of the projectors, based on detection of the obstacle by the detection unit.

12. A method, causing a computer to acquire, in response to input information, projection position information associated with the input information, instruct a projector to emit light or project an image enabling a user to identify a position based on the acquired projection position information, detect an obstacle in a direction in which the projector emits light or projects the image, determine at least one of the projectors among a plurality of the projectors, based on detection of the obstacle.

13. A recording medium storing a program, the program causing a computer to acquire, in response to input information, projection position information associated with the input information, and instruct a projector to emit light or project the image enabling the user to identify a position based on the acquired projection position information, detect an obstacle in a direction in which the projector emits light or projects the image, determine at least one of the projectors among a plurality of the projectors, based on detection of the obstacle.

* * * * *